United States Patent [19]
Wade et al.

[11] 3,875,523
[45] Apr. 1, 1975

[54] AMPLIFIER CIRCUIT FOR GRAPHICAL RECORDER

[75] Inventors: John M. Wade; Donald W. Huff, both of Poway; Jeffrey D. Furman, San Diego, all of Calif.

[73] Assignee: Hewlett-Packard Company, Palo Alto, Calif.

[22] Filed: May 21, 1973

[21] Appl. No.: 362,564

[52] U.S. Cl.................. 330/69, 330/9, 330/30 D
[51] Int. Cl. .............................................. H03f 1/00
[58] Field of Search....................... 330/69, 30 D, 9

[56] References Cited
UNITED STATES PATENTS
3,757,241  9/1973  Kime et al. ................... 330/69 X

*Primary Examiner*—Nathan Kaufman
*Attorney, Agent, or Firm*—Stephen P. Fox

[57] ABSTRACT

In a recording or measuring instrument such as an x-y chart recorder, an amplifying circuit reduces the current flow into and out of circuit input terminals due to the presence of common mode voltage and/or noise source voltage from the unbalance capacitance in the instrument's power transformer. The circuit utilizes operational amplifiers to drain the excess noise current and to provide a high input impedance to prevent current flow in response to a common mode voltage.

7 Claims, 1 Drawing Figure

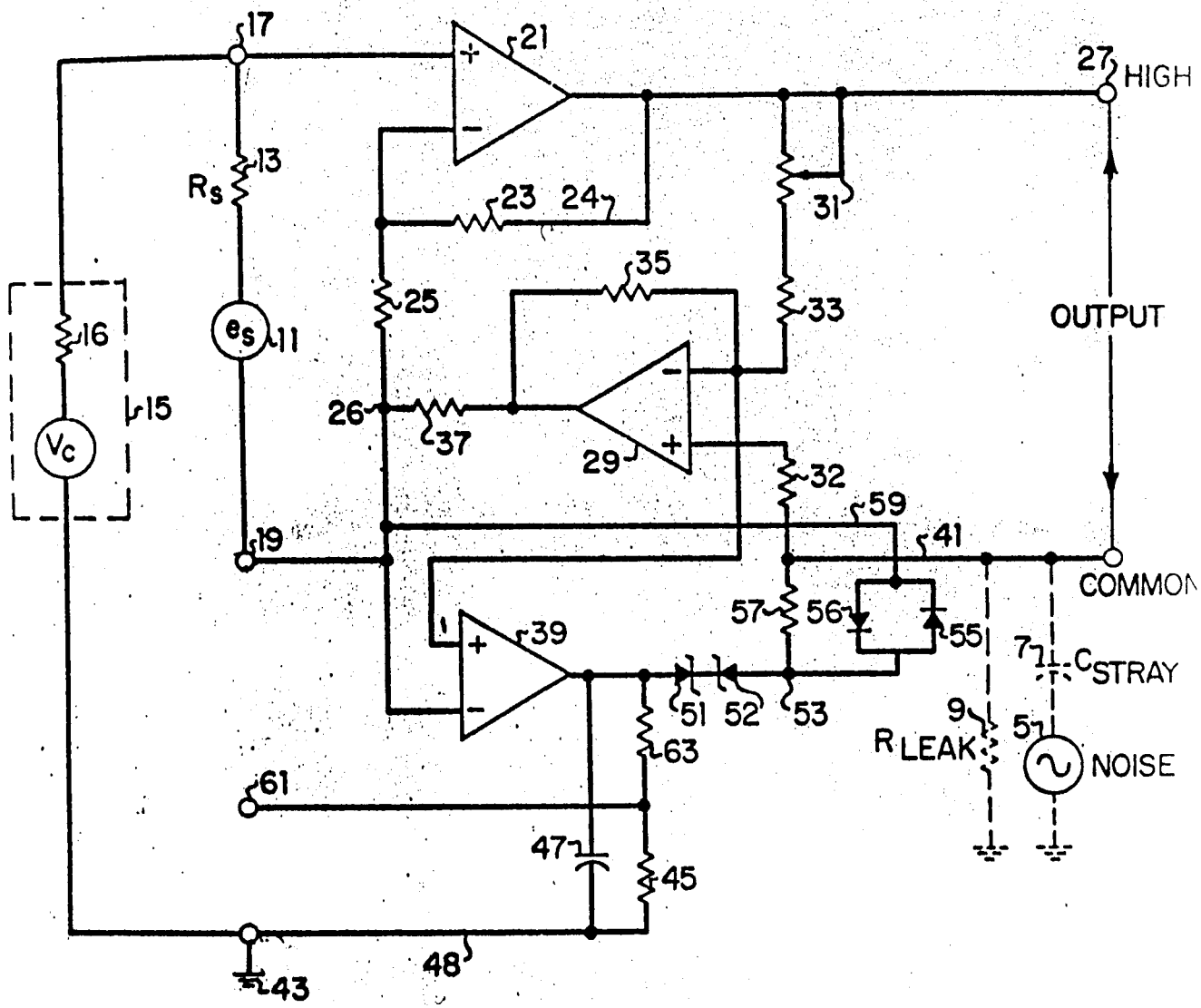

AMPLIFIER CIRCUIT FOR GRAPHICAL RECORDER

BACKGROUND OF THE INVENTION

Conventional amplifier circuits usually have a common input terminal and a high input terminal whereby the input signal source and input resistance may be connected to the common terminal in series with a common mode voltage which is applied to both the common and high input terminals. One problem that arises is that the primary and secondary windings of the transformer in the power supply of the recording or measuring instrument usually have an unbalance capacitance to ground which creates a noise voltage and causes a current to flow out the common input terminal, through the source resistance and then to ground. The resulting voltage drop across the source resistance appears as an input signal to the circuit. Hence, the true signal is distorted.

A second problem arises when a common mode voltage is applied to the circuit input terminal. The common mode voltage causes a current to flow through the source resistance into the common input terminal, thence through the leakage impedance to ground and back to the common mode voltage source. This again causes a voltage drop across the source resistance which appears as an input to the circuit and distorts the true input. Thus, the circuit is sensitive to both the application of a common mode voltage and the current generated by the unbalance capacitance from the instrument's power transformer.

Several methods have been used to alleviate the extraneous current superimposed on the input signal. One method is to apply "box shielding" techniques to minimize the unbalance capacitance to ground in the power transformer. This is done by enclosing the secondary windings of the power transformer in a copper box which then eliminates any stray capacitance to ground. However, since it is necessary to penetrate the enclosure to accommodate the transformer wires, the capacitance shield is not complete and there is still some stray unbalance capacitance. This method can reduce the stray unbalance capacitance by a factor of ten, but it is very expensive.

Another possible solution is to prohibit any input resistance between ground and the common input terminal. However, this is unsatisfactory in many measurement applications where a source resistance cannot be avoided.

A third method is to provide a polarity switch in the amplifier of the measuring or recording instrument which reverses the polarity of the output for the same polarity of input signal. This effectively turns the common input terminal into the high input terminal and vice versa. Now, the input resistance can be in series with the new common input terminal since the leakage resistance, capacitance and noise voltages are associated with the new input terminal which is shunted to ground. This solution, however, is inadequate in measurement applications where an impedance must exist in series with both terminals simultaneously; or where an impedance must be only in series with one terminal but has to be switched from one terminal to the other without adjustments as in some gas chromatographs, for example.

There is still another method which utilizes separate amplifiers for each input terminal followed by a differential amplifier to drive the output. The high impedance characteristic of the input amplifiers is utilized to prevent any currents from flowing out of the circuit input terminals. The problem with this configuration is the voltage drift of both input amplifiers has an additive effect on the output voltage. Therefore, to achieve a given stability, both amplifiers must have no more than half the drift of the original single preamplifier. It is often not economically feasible to achieve this stringent performance requirement. In addition, the random noise factor is approximately 40 percent more than the original noise factor, and the expected common mode rejection of 80 db for this method is below industry standard where 140 db is common.

There are other schemes, including guarding, which places an electrical shield around the circuit to isolate the circuit from ground and thereby eliminate any path for the noise current to flow out of the circuit input terminals. With the guarding scheme, it is critical that the guard terminal be driven at the same potential as the input voltage since the circuit is no longer referenced to ground but now reference to the guard voltage. This solution is probably used most often to eliminate the problems mentioned. However, guarding has some drawbacks such additional cost, the need for guard amplifiers, and the burden of driving a guard terminal.

SUMMARY OF THE INVENTION

The present invention relates to an amplifier circuit which permits the user to make measurements or recordings free from the effects of common mode voltage and unbalance capacitance from power transformers, without driving a guard terminal, when the input signal is less than a predetermined input voltage range of an operational amplifier in the circuit, for example, 10V. Since roughly 90 percent of all measurements and recordings taken are at less than 10V, the present invention obviates, in most instances, the need for expensive shielding techniques or the burden of driving a guard terminal. When the input signal exceeds the range of the amplifier, then an auxiliary input terminal is driven to circumvent the saturation limitation of the amplifier.

The present invention also permits the application of an input signal voltage to either one of the input terminals as required in some measurement applications where an impedance must exist in series with both terminals simultaneously or where an impedance must be only in series with one terminal, but has to be switched from one input terminal to another as in gas chromatographs, for example.

In the illustrated embodiment of the circuit of the invention, the high input signal, i.e., the sum of the common mode voltage and signal source voltage, is applied to the high input terminal, and the common mode voltage is applied to the low input terminal. The high input signal is amplified by a first operational amplifier, including a feedback loop, which drives both the high output terminal of the circuit and the input of a second operational amplifier. The second operational amplifier serves as an inverting amplifier and the output thereof is connected to the input resistor of the first operational amplifier. Since the input voltage of the second operational amplifier equals the output of the first operational amplifier, the second operational amplifier produces an equal but negative potential to dissipate the feedback current of the first operational amplifier, thereby preventing it from flowing out of the circuit low input terminal. A third operational amplifier is used to drive a common line to the same potential as the voltage appearing on the low input terminal of the circuit. The third operational amplifier drives the common line with respect to: (1) ground when the input signal is less than the voltage range of the third operational amplifier; or (2) the voltage applied to the auxiliary circuit input terminal when the input signal exceeds the third operational amplifier's voltage range. The third operational amplifier also provides a low impedance shunt to ground for the transformer noise coupled into the common line, thereby preventing this noise from generating a current flow out of either of the circuit input terminals.

The power supply of all the operational amplifiers in the circuit is referenced to the common line rather than to ground as in conventional applications. This arrangement eliminates the potential paths to ground for stray voltages through the first and second operational amplifiers and permits the third operational amplifier to drive the common line to the same potential as the voltage appearing on the low input terminal.

BRIEF DESCRIPTION OF THE DRAWING

The single FIGURE is a schematic diagram illustrating the preferred embodiment of the improved amplifier circuit incorporating the present invention.

DESCRIPTION OF THE PREFERRED EMBODIMENT

Referring now to the FIGURE, there is shown a noise generator 5, a capacitor 7 and a resistor 9 representing the noise current source, the stray capacitance and the leakage resistance respectively in the circuit. The input signal to be amplified is represented by a signal source 11 with input resistor 13 and the common mode voltage source 15 with source impedance 16. The signal source 11 is coupled beween input terminals 17 and 19, and the common mode voltage source 15 is coupled to input terminal 17 and to input terminal 19 through source impedance 16, resistor 13 and signal source 11. Input terminal 17 is connected to the input of an operational amplifier 21 with feedback loop 24 and having a gain equal to the ratio of the sum of a feedback resistor 23 and an input resistor 25 to the input resistor 25. The output of amplifier 21 is coupled to the circuit's high output terminal 27 and a first input of a second operational amplifier 29.

The first input of amplifier 29 has a potentiometer 31 connected in series with an input resistor 33 to equal the resistance of the feedback resistor 35 of operational amplifier 29. Amplifier 29 serves as an inverting amplifier and provides a negative unity gain at the output thereof. This negative output, having the same magnitude as the feedback voltage of amplifier 21, biases the feedback current of amplifier 21 to flow through resistor 37 at the output of amplifier 29. Therefore, any current appearing in feedback loop 24 of operational amplifier 21 is drained by operational amplifier 29, thereby leaving no net current to flow out of circuit input terminal 19. A current drift compensation resistor 32 is coupled between a second input of amplifier 29 and a common line 41 to eliminate the effect of bias current drift at the input terminals of amplifier 29.

Input terminal 19, to which the signal source is applied, is coupled to the input of a third operational amplifier 39. The amplifier 39 operates to drive the common line 41 to the same voltage level as the voltage applied to input terminal 19, as described hereinafter. Resistors 45, 63 and a capacitor 47 are coupled in parallel between the output of amplifier 39 and ground 43 to provide a low impedance shunt to ground for the transformer noise coupled into the common line 41 from the power supply. Ground 43 also provides a reference potential for amplifier 39 to drive common line 41. The aforementioned connection to ground reference potential 43 is part of a negative feedback path 48 for amplifier 39. Feedback path 48 couples the output of amplifier 39 to its negative input terminal through the network of resistors 45, 63 and capacitor 47, the common mode voltage source 15, resistor 13, input signal source 11 and input terminal 19. The output of operational amplifier 39 is also connected to its negative input terminal through an alternate feedback path 59 comprising of a pair of serially connected and oppositely poled zener diodes 51, 52 and a pair of parallel connected oppositely poled diodes 55, 56. A junction point 53, between the aforementioned two pairs of diodes is connected through a resistor 57 to the common line 41. The aforementioned network of diodes 51, 52, 55, 56 and resistor 57 biases and activates the alternate negative feedback path 59 when amplifier 39 approaches the saturation point, as described hereinafter. An auxiliary input terminal 61 is connected to the output of amplifier 39 through resistor 63 to provide an alternate reference voltage for amplifier 39 when the input voltages exceed the range of amplifier 39, as described hereinafter.

In normal operation, the common mode input voltages to terminals 17, 19 are less than the voltage range of amplifier 39, the reference voltage at terminal 61 is not connected and the input voltages are applied to input 17 and input 19. The signal at input 17 is amplified by amplifier 21 which drives its own feedback loop 24, the circuit output terminal 27 and the input to amplifier 29. Potentiometer 31 is adjusted so the cumulative input resistance of amplifier 29 equals the feedback resistance 35 for unity gain. Since amplifier 29 inverts the input signal, the output thereof is the negative of the voltage across the feedback loop of amplifier 21. Since the resistor 37 is equal to the sum of resistors 23 and 25, it provides just the amount of negative bias needed to draw all of the current flowing to junction point 26 from resistors 23, 25 through resistors 37. With this arrangement, current is drained via resistor 37 before it can flow out of input terminal 19 and through the source resistor 13 to distort the true input signal.

When the common mode voltages applied to the input of amplifier 39 through input terminal 19 are within the voltage range of amplifier 39, this amplifier, with its power supply referenced to common line 41, serves as a voltage follower and varies the voltage potential on common line 41 to equal the input voltage applied to input terminal 19. At the output of amplifier 39, the capacitor 47 and resistor 45 shunt to ground the high and low frequency transformer noise, respectively, which is coupled into the common line 41 from the power supply of the instrument. This prevents the noise from generating a current flow out of input 17 or input 19 and adding an error to the input signal. Also, when the common mode signal is within the voltage range of amplifier 39, the output thereof is less than the predetermined voltage needed to activate the pair of serially connected, oppositely poled zener diodes 51, 52. Hence, these diodes are nonconductive and thereby render inactive and network of biasing resistor 57, the pair of diodes 55, 56, and alternate negative feedback path 59.

When the common mode voltages applied to input terminals 17, 19 exceed the range of amplifier 39, feedback path 59 will be activated, as described hereinafter, unless a voltage approximating the common mode voltage is applied between the output of amplifier 39 and ground 43 through an auxiliary input terminal 61 and a resistor 63. Now, amplifier 39 need only supply the voltage difference between the common mode voltage applied through input terminal 19 and the voltage applied to input terminal 61 to set the common line 41 equal to the common mode voltage applied at input terminal 19. If no signal is applied to input terminal 61 under the above conditions and feedback path 59 is activated, the circuit still functions but it loses its ability to shunt to ground 43 the noise voltage induced into line 41 from the power supply of the instrument in which this amplifier circuit functions, and this noise voltage appears at input terminal 19. Thus, the common mode voltages applied to the circuit can exceed the range of operational amplifier 39 without activating feedback path 59, providing that the auxiliary input terminal 61 is driven to approximately the same potential as input terminal 19 and the difference between the voltages applied at input terminals 19 and 61 does not exceed the range of operational amplifier 39.

Feedback path 59, i.e., the alternate negative feedback path for operational amplifier 39, is necessary to keep amplifier 39 from saturating either as described above, or when signal source 11 is a floating signal source, e.g. a battery, and hence, does not include a common mode voltage source. The absence of a common mode voltage source 15 disrupts feedback path 48 of amplifier 39 which normally goes through the common mode voltage source 15 and the circuit input terminal 19 to the input of amplifier 39. Without feedback path 48, amplifier 39 would become an open loop gain amplifier, and any stray noise or voltage that appeared at its inputs would be amplified with high gain. However, before amplifier 39 reaches the saturation point, the output voltage exceeds a predetermined potential at which zener diodes 51, 52 become conductive. The output current of amplifier 39 produces a voltage difference across the resistor 57. The voltage difference across resistor 57 also produces a second predetermined voltage difference across the pair of diodes 55, 56 between junction 53 and the input of amplifier 39. This forward biases one of the diodes, depending on the polarity of biasing voltage, and renders the alternate negative feedback path 59 conductive to keep amplifier 39 from saturation, thereby insuring that the common line 41, driven by amplifier 39, will have the same voltage potential as applied to input 19. The other portions of the circuit operate in the same manner as previously described.

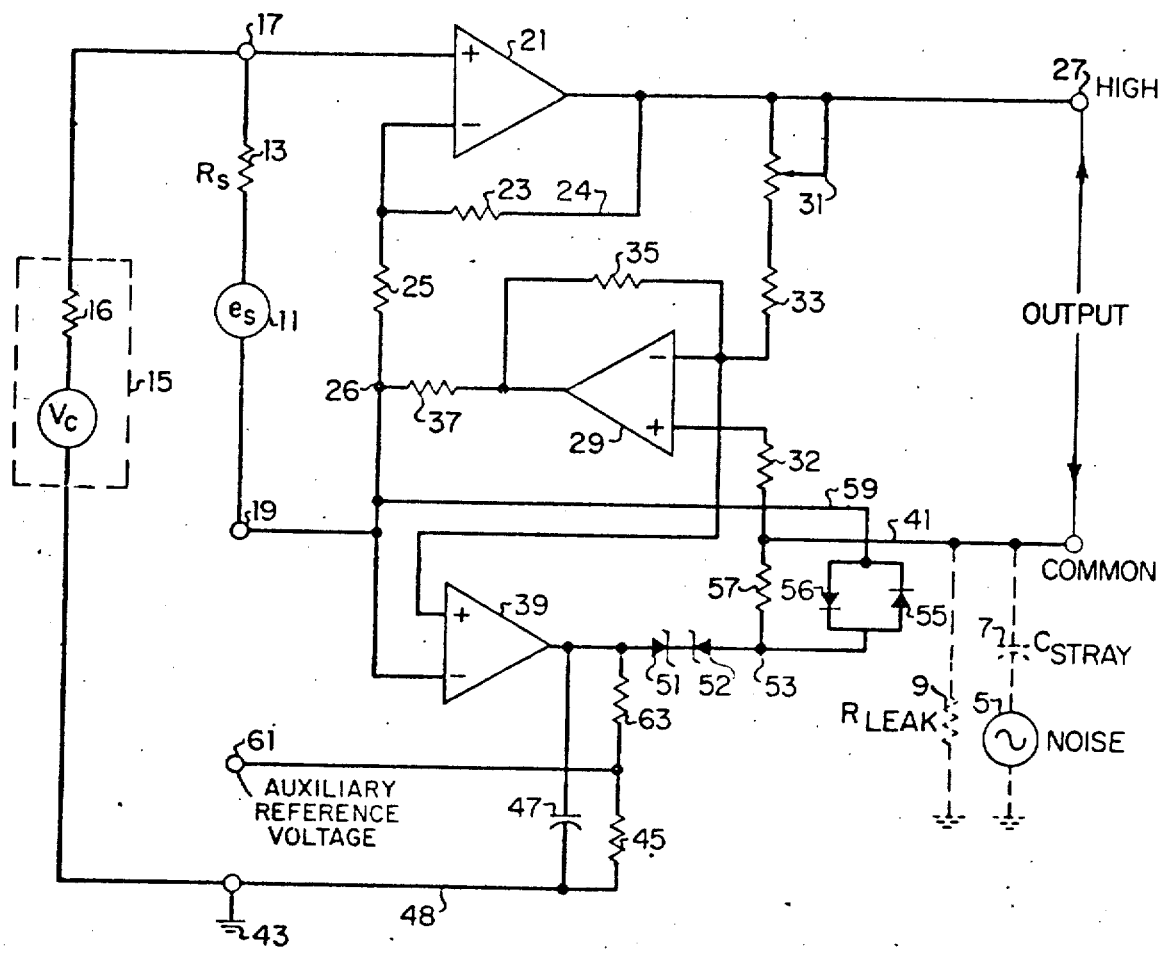

We claim:

1. An amplifier circuit for eliminating the current flow into and out of the input terminals thereof resulting from a common mode voltage source in the signal source applied to the input terminals, and from a noise source voltage coupled in through the power supply of an instrument in which the amplifier circuit functions, said amplifier circuit comprising:

first and second circuit input terminals and first and second circuit output terminals;

a common line coupled to said second circuit output terminal;

first operational amplifier means having a first input, a second input, an output and a feedback network including a feedback resistor coupled to said second input, said first input being coupled to said first circuit input terminal, said second input being coupled to said second circuit input terminal, and said output being coupled to said first circuit output terminal;

second operational amplifier means having a first input, a second input, an output and a feedback network including a feedback resistor, said last named first input being coupled to the output of said first operational amplifier means, said last named second input being coupled to said common line, and the output of said second operational amplifier means being coupled to said second input of said first operational amplifier means and to said second circuit output terminal for dissipating the feedback current of said first operational amplifier means;

third operational amplifier means having a first input coupled to the first input of said second operational amplifier means, a second input coupled to said second circuit input terminal, an output, and first and second feedback means coupling said last named output to the second input of said third operational amplifier means for driving the common line to the same potential as applied to said second circuit input terminal and for preventing said third operational amplifier means from saturating.

2. The circuit of claim 1, wherein said second operational amplifier means is an inverting amplifier including:

an output resistor coupled between the output of said second operational amplifier means and the second input of said first operational amplifier means;

a current drift compensation resistor coupled between the second input of said second operational amplifier means and said common line for eliminating the effects of bias current drift on the output of said second operational amplifier means;

an input resistor and variable resistance means coupled in series with said first input of said second operational amplifier means for matching the cumulative input resistance of said second operational amplifier means to said feedback resistor of said second operational amplifier means to provide negative potential to draw the feedback current of said first operational amplifier means through said output resistor of the second operational amplifier means and thereby drain the feedback current.

3. The circuit of claim 1 further including a source of ground potential and wherein said third operational amplifier means includes a resistor and a capacitor coupled in parallel between the output of said third operational amplifier means and said source of ground potential for the conduction of noise signals in the circuit to ground.

4. The circuit of claim 3 wherein said first feedback means couples the output to the second input of said third operational amplifier means through a common mode voltage source on said signal source and said second circuit input terminal.

5. The circuit of claim 3 wherein said second feedback means of said third operational amplifier includes a first pair of serially connected, oppositely poled, asymmetrically conducting means coupled in series with a second pair of parallel connected, oppositely poled, asymmetrically conducting means for rendering said second feedback mean conductive when a feedback path through said first feedback means of said third operational amplifier means is absent, or when a common mode voltage exceeds the range of said third operational amplifier.

6. The circuit of claim 5 further including biasing means coupled between a junction of said first and second pairs of asymmetrically conducting means and said common line for producing a predetermined potential difference across said second pair of oppositely poled asymmetrically conducting means.

7. The circuit of claim 1 further including an auxiliary input terminal coupled to the output of said third operational amplifier means through a resistor for receiving an alternate reference potential for said third operational amplifier means when the input voltage applied to said second circuit input terminal exceeds the voltage range of said third operational amplifier means.

* * * * *

UNITED STATES PATENT OFFICE
CERTIFICATE OF CORRECTION

Patent No. 3,875,523           Dated April 1, 1975

Inventor(s) John M. Wade, et al.

It is certified that error appears in the above-identified patent and that said Letters Patent are hereby corrected as shown below:

Attach the enclosed drawing to the above patent; and

Column 5, line 3, cancel "and" and substitute -- the --.

Signed and Sealed this

*thirtieth* Day of *September 1975*

[SEAL]

*Attest:*

RUTH C. MASON  
*Attesting Officer*

C. MARSHALL DANN  
*Commissioner of Patents and Trademarks*